May 10, 1955  J. G. SQUARCIO  2,707,912
DISPOSABLE FRUIT SLICE SQUEEZERS
Filed Aug. 23, 1954

INVENTOR.
JOSEPH G. SQUARCIO
BY
Martin E. Anderson
ATTORNEY

United States Patent Office 2,707,912
Patented May 10, 1955

2,707,912

DISPOSABLE FRUIT SLICE SQUEEZERS

Joseph G. Squarcio, Denver, Colo.

Application August 23, 1954, Serial No. 451,426

3 Claims. (Cl. 100—211)

This invention relates to fruit squeezers and, more particularly, to disposable fruit slice squeezers.

A number of common beverages are rendered more palatable through the addition of a small amount of citrus fruit juice, particularly lemon juice. The fruit for this purpose is frequently served in small wedge shaped or similarly cut slices and placed on the rim of the beverage glass. It is well known that while squeezing the lemon juice into the beverage a stream of lemon juice frequently squirts into the face or onto the clothing of persons at the table. This is, of course, an extremely annoying and embarassing occurrence, especially among guests. Also, lemon juice and other citrus fruit juices are quite acid and may leave permanent stains on the clothing. Furthermore, it is difficult to squeeze a slice of lemon without getting some of the juice on the hands and fingers.

It is, therefore, the principal object of the present invention to provide a disposable fruit slice squeezer for use with slices of lemon and the like which covers the fruit and prevents the juices from squirting.

A second object is to provide a fruit slice squeezer which is sanitary and keeps the juice off the hands and fingers.

Another object of the invention is the provision of a fruit squeezer which costs so little that it may be disposed of after use.

Further objects of the invention are to provide a fruit squeezer which is simple, convenient and sanitary to use, and decorative in appearance.

Other objects will be in part apparent and in part pointed out specifically hereinafter in connection with the description of the drawing which follows, and in which.

Figure 1:
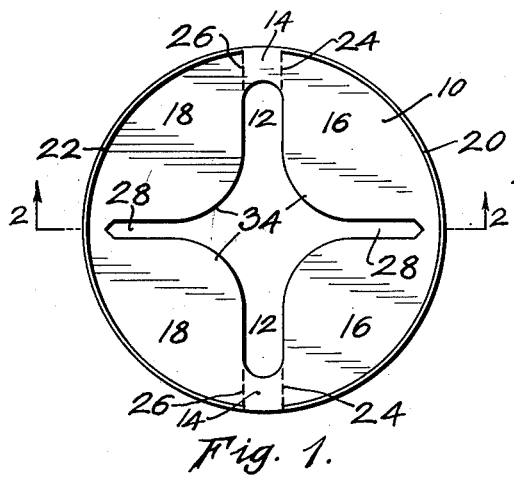
Figure 1 is a top plan view of the disposable fruit slice squeezer of the present invention showing it in its entirety in open position.
Figure 2:
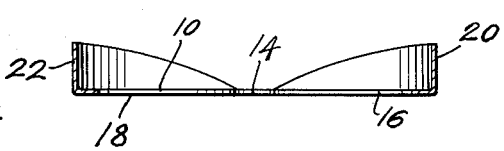
Figure 2 is a transverse section taken along line 2—2 of Figure 1.
Figure 4:
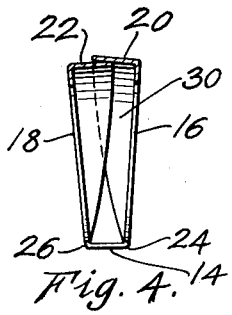
Figure 4 is a vertical section taken along line 4—4 of Figure 3.
Figure 6:
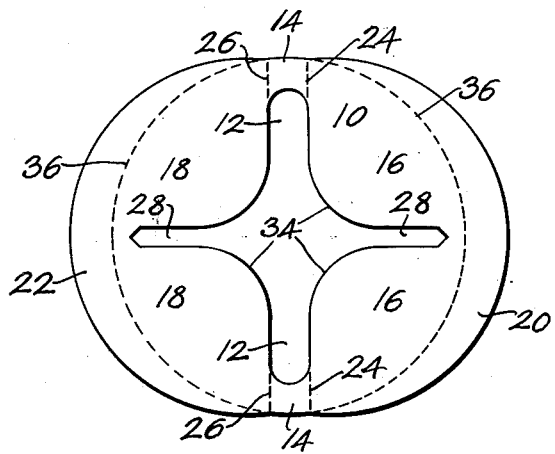
Figure 6 is a view showing the blank from which the squeezer is formed with the fold lines indicated by dotted lines.

Referring now in particular to Figures 1 and 2 of the drawing, the disposable fruit slice squeezer of the present invention will be seen to comprise a substantially circular body portion 10 having an elongate juice opening 12 along a diameter of the body portion and terminating at hinge portions 14 which interconnect wall portions 16 and 18 of the body. The peripheral edges of wall portions 16 and 18 are provided with integral rim portions 20 and 22 respectively which extend upwardly therefrom. Fold line 24 forms the line of division between hinge portions 14 and wall portion 16; and, fold line 26 forms the line of division between the hinge portions and wall portion 18. In the preferred embodiment of the present invention rim portion 20 increases in depth from fold line 24 to its midpoint, as shown in Figures 2, 4 and 6; and likewise, rim portion 22 increases in depth beginning at fold line 26. Although fold lines 24 and 26 may be made to coincide with one another for use with wedge shaped fruit slices, it is preferred that these fold lines be in spaced substantially parallel relation to one another in order that the juice may pass freely through the elongate juice opening 12, and so that fruit slices having a uniform thickness may be accommodated as well as wedge shaped slices. A slit 28, preferably lying on a diameter of the body portion, intersects juice opening 12 and divides each wall portion 16 and 18 into two or more segments; preferably two substantially equal segments.

Figure 3:
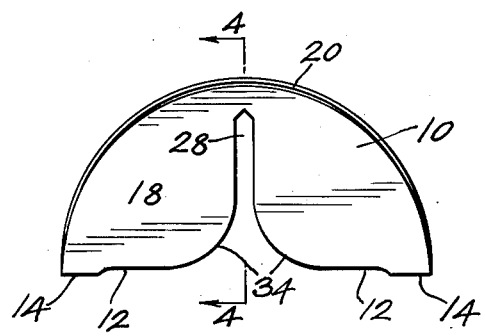
Figure 3 is a side elevation showing the squeezer in folded position.

The disposable fruit slice squeezer of the present invention is shown in Figures 3 and 4 folded along fold lines 24 and 26 to bring wall portions 16 and 18 opposite one another and with rim portion 20 overlapping rim portion 22 as shown most clearly in Figure 4. A pocket 30 sized to receive a slice of fruit such as a lemon or the like is thus formed between the wall portions and the rim portions.

Figure 5:
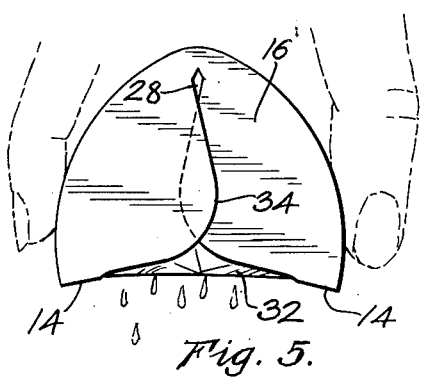
Figure 5 shows a slice of lemon or other fruit in position inside the disposable squeezer with the juice being extracted therefrom by squeezing it between the thumb and forefinger.

As shown in Figure 5, hinge portions 14 interconnect the wall portions in hinged relation; and in addition, form means for retaining the fruit slice within the pocket so that it will not drop out. Juice opening 12 extends along the lower edge of the folded squeezer so that the juice squeezed from the fruit may drop out freely. A slice of lemon or other fruit 32 is placed in the squeezer with the rind adjacent the rim portion and the pulp lying along the juice opening; whereupon, the squeezer is folded as aforementioned and the fruit slice will then lie within pocket 30. The juice may then be squeezed from the fruit by grasping the squeezer between the thumb and forefinger on the rim portion adjacent the hinge portions and squeezing the hinge portions toward one another. Slit 28, which extends substantially to the rim portions permits the segments of each wall portion to overlap one another thus making it possible to squeeze nearly all of the juice from the fruit. In the preferred embodiment of the invention edges 34 at the intersection of juice opening 12 and slit 28 are curved so that they will not contact the rim portions or the fingers and prevent the squeezer from being substantially closed. Wall portions 16 and 18 cover the pulp of the fruit and prevent the juice from squirting. The thumb and forefinger are not in contact with the fruit and the juice does not get on them. It is also convenient to dispose of the rind and pulp without touching it by merely spreading the segments of the wall portions apart with the fingers and opening the slit; whereupon, the fruit will no longer be retained by the hinge portions 14 and is free to drop out. Slit 28 also forms a convenient means for passing the squeezer and fruit slice over the rim of the beverage glass.

Figure 6 illustrates the manner in which the fruit squeezer of the present invention is formed from a single piece of thin cardboard, paper or the like cut into an oval shape. Cardboard or paper having a coat of paraffin wax similar to that used for paper cups and cardboard milk cartons serves the purpose quite well. Curved dotted lines 36 represent the fold lines along which the wall portions are folded to form the rim portions. The squeezer is preferably symmetrical about the diameter of the circular body portion on which the elongate juice opening is placed. Also, the narrow slit 28 is preferably positioned with its center line passing through the center of the circular body portion at right angles to the center line of the juice opening which is slightly wider.

Having thus described the many useful and novel features of the present invention in connection with the description of the drawing it will be seen that the objects for which it was designed have been achieved; and therefore,

I claim:

1. A disposable fruit slice squeezer comprising: a foldable body portion of stiff paper having an elongate juice opening therein dividing said body portion into two wall portions interconnected by hinge portions lying at the ends of said juice opening; the wall portions having a slit therein dividing each of said wall portions into two segments and intersecting the juice opening; rim portions formed on the peripheral edges of the wall portions in position to overlap one another when said wall portions are folded into opposed relation along the hinge portions; the opposed wall portions and the rim portions combining in folded position to form a pocket sized to receive a fruit slice in position with the pulp thereof adjacent the juice opening; whereby, pressure applied in a direction to force the hinge portions together with a fruit slice in the pocket will cause the segments of each wall portion to overlap and the fruit slice to be squeezed thus forcing the juice therefrom.

2. A disposable fruit slice squeezer comprising: a foldable substantially circular body portion of stiff paper having an elongate juice opening therein dividing said body portion along a diameter into two wall portions interconnected by hinge portions lying at the ends of said juice opening; the wall portions having a slit therein dividing each of said wall portions into two substantially equal segments and intersecting the juice opening; rim portions formed on the peripheral edges of the wall portions in position to overlap one another when said wall portions are folded into opposed relation along the hinge portions; the opposed wall portions and the rim portions combining to form a pocket sized to receive a fruit slice in position with the pulp thereof adjacent the juice opening; whereby, pressure applied in a direction to force the hinge portions together with a fruit slice in the pocket will cause the segments of each wall portion to overlap and the fruit slice to be squeezed thus forcing the juice therefrom.

3. A disposable fruit slice squeezer comprising: a foldable substantially circular body portion of stiff paper having an elongate juice opening therein dividing said body portion along a diameter into two wall portions interconnected by hinge portions lying at the ends of said juice opening; the wall portions having a slit therein dividing each of said wall portions into two substantially equal segments and intersecting the juice opening at substantially a right angle; rim portions formed on the peripheral edges of the wall portions in position to overlap one another when said wall portions are folded into opposed relation along the hinge portions; two spaced substantially parallel fold lines forming the line of division between the hinge portions and each wall portion; the opposed wall portions, the rim portions and the hinge portions combining to form a pocket sized to receive a fruit slice in position with the pulp thereof adjacent the juice opening; whereby, pressure applied in a direction to force the hinge portions together with a fruit slice in the pocket will cause the segments of each wall portion to overlap and the fruit slice to be squeezed thus forcing the juice therefrom.

References Cited in the file of this patent

UNITED STATES PATENTS

| | | |
|---|---|---|
| 1,858,435 | Conlon | May 17, 1932 |
| 2,235,909 | Wald | Mar. 25, 1941 |

FOREIGN PATENTS

| | | |
|---|---|---|
| 642,158 | Germany | June 11, 1937 |